(12) United States Patent
Collins et al.

(10) Patent No.: US 8,192,318 B2
(45) Date of Patent: Jun. 5, 2012

(54) AUTOMATIC TRANSMISSION WITH CLOSED LOOP PRESSURE ELECTRO-HYDRAULIC CONTROL MODULE

(75) Inventors: Duane Z. Collins, El Paso, TX (US); Andrew D. Herman, Grand Blanc, MI (US); Michael A. Kozan, Canton, MI (US); Quan Zheng, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 251 days.

(21) Appl. No.: 12/638,350

(22) Filed: Dec. 15, 2009

(65) Prior Publication Data

US 2010/0137093 A1    Jun. 3, 2010

Related U.S. Application Data

(63) Continuation-in-part of application No. 11/691,153, filed on Mar. 26, 2007, now abandoned.

(51) Int. Cl.
*F16H 47/08* (2006.01)
*F16H 31/00* (2006.01)
(52) U.S. Cl. .............................. 475/64; 475/70; 475/127
(58) Field of Classification Search .................... 475/61, 475/64, 70, 120, 127
See application file for complete search history.

(56) References Cited

U.S. PATENT DOCUMENTS

| | | | |
|---|---|---|---|
| 3,263,522 A * | 8/1966 | General | 477/66 |
| 5,122,104 A * | 6/1992 | Ohkubo | 475/291 |
| 5,911,642 A | 6/1999 | Andres et al. | |
| 6,308,725 B1 | 10/2001 | Lawlyes et al. | |
| 6,634,982 B2 | 10/2003 | Miki et al. | |
| 6,755,761 B2 | 6/2004 | Hunnicutt et al. | |
| 6,807,472 B2 | 10/2004 | Ford et al. | |
| 6,943,657 B2 | 9/2005 | Subramanian et al. | |
| 7,120,531 B1 | 10/2006 | Melby et al. | |
| 2005/0139401 A1 | 6/2005 | Fujioka | |
| 2008/0236539 A1 | 10/2008 | Zheng et al. | |

FOREIGN PATENT DOCUMENTS

| | | |
|---|---|---|
| JP | 62200037 A2 | 9/1987 |
| WO | 2008118245 A2 | 10/2008 |

* cited by examiner

*Primary Examiner* — Edwin A Young
(74) *Attorney, Agent, or Firm* — Thomas N. Twomey

(57) ABSTRACT

An automatic transmission is disclosed that includes a clutch pressure control module housing having therein:

(1) a plurality of solenoid valves, each of the solenoid valves configured to receive an input of the pressurized hydraulic fluid and to provide a variable output pressure of pressurized hydraulic fluid in response to an electric control signal;

(2) means for sensing output pressure from each of the solenoid valves of the plurality of solenoid valves; and (3) electronic control means configured to generate electric control signals to one or more of the solenoid valves of the plurality of solenoid valves in response to (i) a clutch pressure command signal or a solenoid pressure command signal, and (ii) a solenoid output pressure signal from the means for sensing output pressure.

The solenoid valves provide hydraulic control signals to clutch hydraulic pressure control valves, which in turn provide hydraulic power to clutch actuators.

9 Claims, 4 Drawing Sheets

AUTOMATIC TRANSMISSION WITH CLOSED LOOP PRESSURE ELECTRO-HYDRAULIC CONTROL MODULE

This is a continuation-in-part of U.S. patent application Ser. No. 11/691,153, filed Mar. 26, 2007.

BACKGROUND OF THE INVENTION

The present invention relates generally to improvements in clutch pressure controls in a vehicle automatic transmission and more particularly to a transmission clutch pressure control via pilot pressure feedback.

Hydraulic fluid controls can be found in a variety of automotive applications such as automatic speed change transmissions as well as others. In these applications, it is often desirable to control the pressure of the hydraulic fluid, as seen by reference to U.S. Pat. No. 6,308,725 entitled "APPARATUS FOR CONTROLLING HYDRAULIC FLUID PRESSURE" issued to Lawlyes et al., assigned to the common assignee of the present invention. Lawlyes et al. disclose a smart actuator including a solenoid element and a pressure sensor element, both of which are in electrical communication with a remote control through a wire harness. Lawlyes et al. provide for remote pressure sensing of a solenoid output.

In the specific context of an automatic speed change power transmission, it is known to use transmission control units that are configured to generate electrical signals that control actuators/solenoids resulting in the control of fluid flow as well as the pressure in a hydraulic fluid line. As known, the pressure of a hydraulic fluid line can be used to control various other elements in an automatic transmission system including for example the engagement of individual gears. By engaging various combinations of gears (e.g., planetary gears in a planetary gear transmission), an automatic transmission system accomplishes the same task as the shifting of gears in a manual transmission. Hydraulically-actuated clutches are also found in transmissions and are typically used for engaging a pair of gears (e.g., a pair of rotating members, or alternatively, one rotating member and one non-rotating member) together such that when the clutch is applied torque can be transmitted from one shaft to the other. Shift changes may also include switching three or more clutches on occasion for certain types of shifts, and herein references to two clutch type shifts could also include the multiple shifts.

An important operating aspect of a hydraulically operated clutch relates to the pressure of the applied hydraulic fluid. In general, such applied pressure is sought to be controlled and varied to achieve a predetermined fluid flow to the clutch in order to obtain a desired engagement characteristic, principally with respect to timing and smoothness. It should be appreciated that if the timing of the engagement of one gear with the disengagement of another gear is not coordinately properly, overall shift performance may suffer. It is thus desirable and known in the art to control the pressure of the hydraulic fluid being supplied to such clutch. However, in some configurations, the hydraulically-actuated clutch needs such a relatively large volume of hydraulic fluid that a combination of a pilot valve and a larger flow, pilot operated valve are used in tandem to control the clutch pressure. In this arrangement, the pilot valve is controlled by a controller or the like to produce a variable pilot pressure output which in turn is supplied to and operates the pilot-operated, larger flow valve. The pilot operated valve, in response, provides a variable output pressure, which is supplied to the hydraulically actuated clutch.

One approach for controlling the clutch pressure in this configuration involves using a pressure sensor disposed to sense the clutch pressure and to generate a clutch pressure signal that is fed back to a controller. However, in some configurations, it is difficult to mount a pressure sensor in the clutch chamber due to various physical constraints. At the same time, there is a need for providing clutch pressure control with a pre-packaged readily-installable module that can fit into available space in a transmission housing without requiring significant modification of other transmission components.

There is therefore a need for a hydraulic clutch pressure control system that minimizes or eliminates one or more of the problems set forth above.

SUMMARY OF THE INVENTION

One advantage of the present invention is that it provides a pressure control having the benefits of a direct measure clutch pressure closed-loop system without the difficulties associated with mounting a pressure sensor in the clutch chamber while providing clutch pressure control with a pre-packaged readily-installable module that can fit into available space in a transmission housing without requiring significant modification of other transmission components.

According to the present invention, there is provided an automatic transmission assembly for a vehicle, comprising a transmission assembly housing having therein:
(a) a torque converter coupling the transmission assembly to an engine drive train;
(b) a planetary gearset capable of engaging multiple gear configurations for varying driving speeds and conditions;
(c) a hydraulically-actuated clutch assembly comprising one or more clutch mechanisms for engaging and disengaging components of the planetary gearset in a synchronized fashion to effectuate gear changes;
(d) a pump coupled to the torque converter for providing pressurized hydraulic fluid;
(e) a pressure control module comprising a control module housing having therein:
  (1) a plurality of solenoid valves, each of the solenoid valves configured to receive an input of the pressurized hydraulic fluid and to provide a variable output pressure of the pressurized hydraulic fluid in response to an electric control signal;
  (2) means for sensing output pressure from each of the solenoid valves of the plurality of solenoid valves;
  (3) electronic control means configured to generate electric control signals to one or more of the solenoid valves of the plurality of solenoid valves in response to (i) a clutch pressure command signal or a solenoid pressure command signal, and (ii) a solenoid output pressure signal from the means for sensing output pressure; and
(f) a valvebody comprising a plurality of hydraulic control valves configured to receive hydraulic input signals from the output of the plurality of solenoid valves and to provide hydraulic output signals to hydraulic actuators to actuate the one or more clutch mechanisms in response to the hydraulic input signals.

Components for closed-loop hydraulic clutch pressure control includes a pilot valve, a pilot pressure sensor, a pressure regulating valve and a control arrangement. The pilot valve has an outlet that is configured to provide hydraulic fluid at a pilot pressure that is variable based on a pilot valve drive signal. The pilot pressure sensor is configured to sense the pilot pressure and generate a pilot pressure signal indicative of the sensed pilot pressure. The pressure regulating valve has an output configured for connection to the clutch and to provide hydraulic fluid at an output pressure that is variable based on the pilot pressure. Finally, the control arrangement is configured to generate the pilot valve drive signal in response to (i) a clutch pressure command signal indicative of a desired output pressure to be provided to the clutch ("clutch pressure"), and (ii) the pilot pressure signal (as a feedback) indicative of the sensed pilot pressure.

In one exemplary embodiment, the control arrangement includes (i) a feed forward control block configured to generate an open loop pilot valve control signal; (ii) a closed loop controller responsive to a pilot pressure error (difference) signal configured to generated a closed loop pilot valve control signal; and (iii) a summer responsive to both the open loop pilot valve control signal and the closed loop pilot valve control signal and configured to produce an output pilot valve control signal. The control arrangement further includes a translation block that converts the output pilot valve control signal into a pilot valve drive signal suitable for the type of pilot valve being used.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
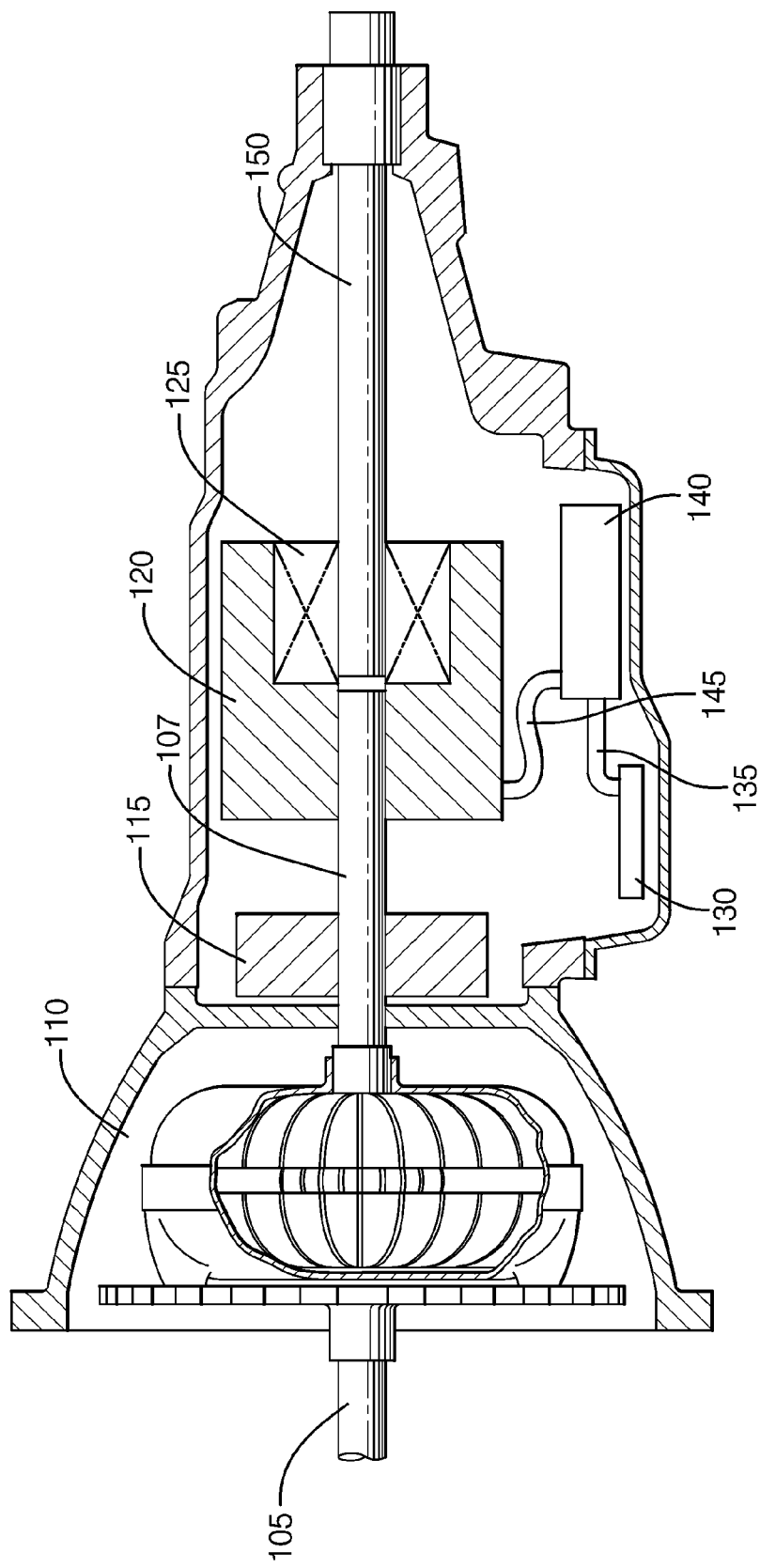
FIG. 1 is a drawing of an automatic transmission assembly with a closed loop electro-hydraulic pressure control module in accordance with the invention.

Referring now to the Figures, where the invention will be described with reference to specific embodiments, without limiting same, Referring now to the drawings wherein like reference numerals are used to identify identical components in the various views, FIG. 1 is a highly-simplified representation of an exemplary automatic transmission assembly with a closed loop electro-hydraulic pressure control module in accordance with the invention. In this exemplary embodiment, drive shaft 105 provides rotational power through torque converter assembly 110 to the turbine shaft 107. Pump 115 runs off of this rotational power to pressurize hydraulic fluid which is provided, among other places, to pressure control module 130 and valvebody 140 through conduits (not shown). Pressure control module 130, which is described in more detail in FIG. 4 below, provides hydraulic control signals through conduit bundle 135 to clutch pressure control valves (not shown) in valvebody 140, which in turn provide hydraulic control to actuators (not shown) in clutch assembly 120. Clutch assembly 120 works in combination with planetary gearset 125 to provide transmission to output shaft 150 of the rotational power that was input from the drive shaft 105, at appropriate gear ratios based on transmission control signals. As stated above, FIG. 1 is a highly-simplified representation of an automatic transmission, and does not show many additional transmission components, such as torque converter locking mechanism, band assemblies, reverse clutch mechanism, speed sensors, and the like, all of which are well-understood in the art.

Figure 2:
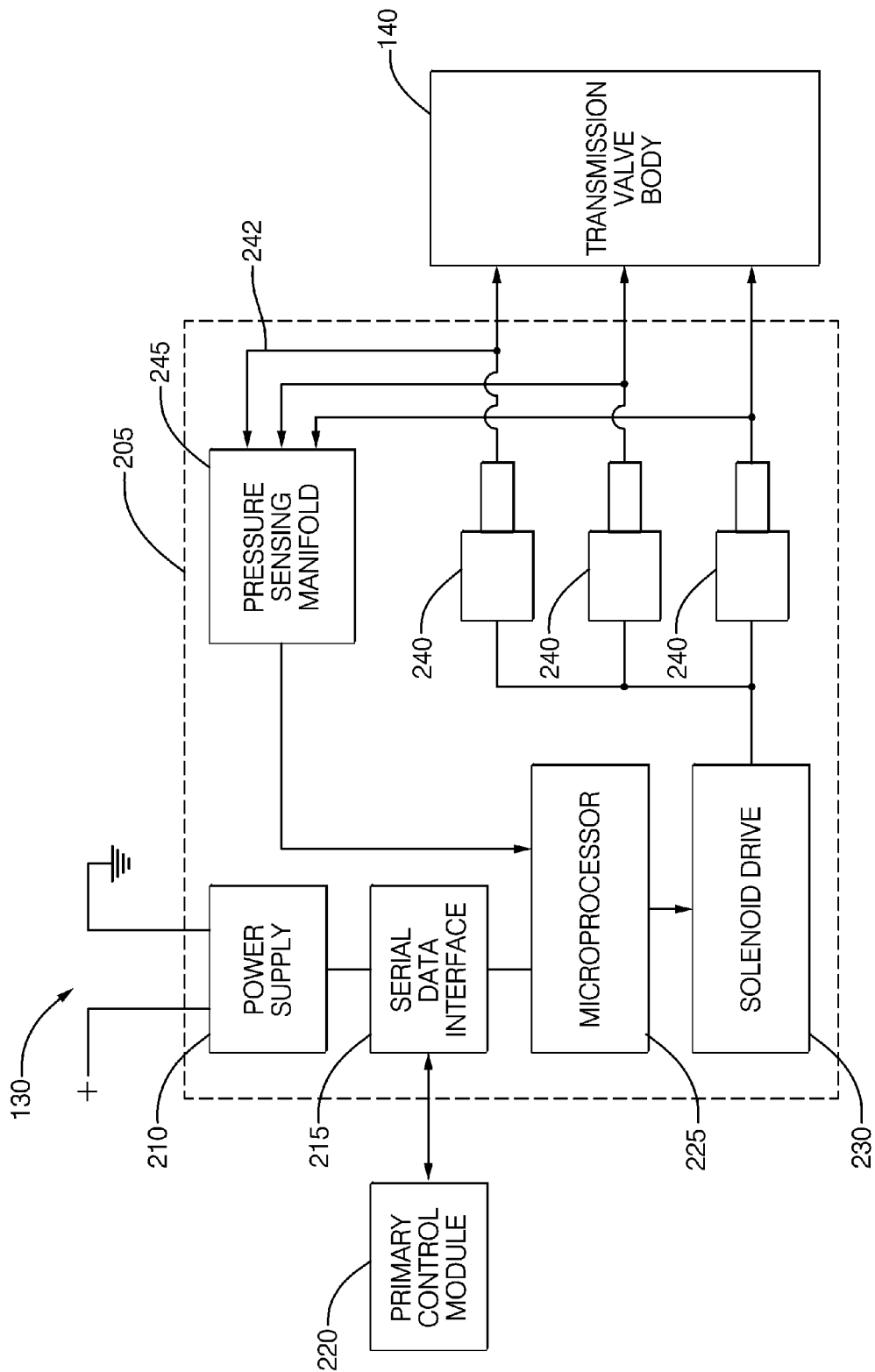
FIG. 2 is block diagram showing an electro-hydraulic control module for a motor vehicle automatic transmission in accordance with the invention.

Turning now to FIG. 2, this Figure is a block diagram showing an electro-hydraulic control module for a motor vehicle automatic transmission in accordance with the invention. In FIG. 2 there is shown an exemplary embodiment of a pressure control module 130 having housing 205 containing power supply 210, which is connected directly or indirectly to the various components in the module that require power as is known in the art. Serial data interface 215 receives a signal for a desired solenoid pressure or a desired clutch control valve pressure from master controller 220, which may be the transmission control module and is external to pressure control module 130. Serial data interface 215 communicates the desired pressure to microprocessor 225, which contains or has access to digital code that contains instructions for carrying out closed-loop pressure control of solenoid valves 240 as described in more detail below with respect to FIG. 4. Using these instructions, microprocessor 225 outputs command signals to solenoid driver electronics 230, which may be an integrated circuit with intelligence or a discrete set of electronic components controlled by the microprocessor as is known in the art. Solenoid electronics 230 in turn outputs electrical control signals to solenoids 240. Solenoids 240 implement valve settings in response to the electrical control signals, which provides hydraulic control signals to the control valves in transmission valvebody 140 to cause those hydraulic control valves to implement valve settings that provide hydraulic fluid pressure to hydraulic actuators in the clutch assembly 120. Pressure sampling conduits 242 branch off of the hydraulic fluid output lines from the solenoids 240 to the pressure sensing manifold 245. The pressure sensing manifold 245 may contain anywhere from one pressure sensor (not shown) to sense solenoid output pressure, in which case output pressure from each of the solenoids 140 may be sampled sequentially using conduits and valves in the pressure sensing manifold to direct the desired solenoid output pressure to the pressure sensor. Alternatively, the pressure sensing manifold 245 may contain multiple pressure sensors to allow for simultaneous pressure sampling/sensing from multiple solenoids. Signals from the pressure sensor(s) in pressure sensing manifold 245 are fed back to microprocessor 225 for use in the closed-loop pressure control scheme.

Figure 3:
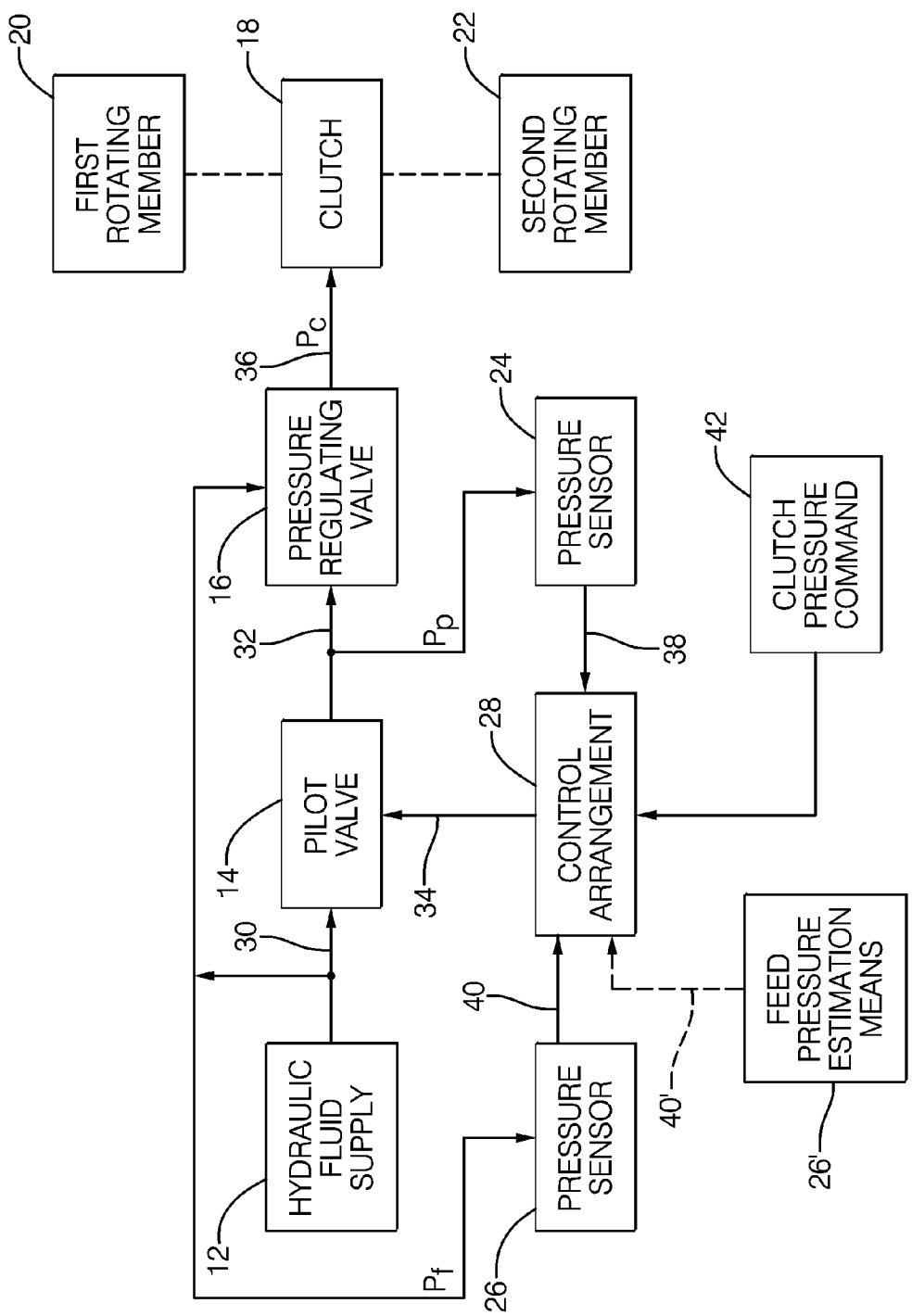
FIG. 3 is a block diagram of components for hydraulic clutch pressure control in accordance with the invention.

Turning now to FIG. 3, this figure is a simplified block diagram of components for controlling hydraulic fluid clutch pressure. These components provide the benefits of direct measure clutch pressure closed loop control without the difficulty of mounting a pressure sensor in the clutch chamber. In an illustrated embodiment, FIG. 3 shows a hydraulic fluid supply 12, a pilot valve 14, a pressure regulating valve 16, a hydraulically-actuated clutch 18, a pair of rotating members 20, 22, a pilot pressure sensor 24, an optional feed or supply fluid pressure sensor 26 and a control arrangement 28. It should be understood that the pair of rotating members in the illustrated embodiment is exemplary only and not limiting in nature. For example, in alternate embodiments, one of the members 20, 22 may comprise a non-rotating member, as described in the Background.

The illustrated embodiment of apparatus 10 may be suitably employed in an automatic speed change power transmission of the type described in the Background. That is, a transmission of the type having a clutch assembly 120 of hydraulic fluid actuated clutches, such as clutch 18, configured such that when applied are operative to engage first and second members (e.g., planetary gears, or other rotating members in one embodiment, or one rotating and one non-rotating member in an alternate embodiment) together so that rotating torque may be transmitted from one member to the other. As also described in the Background, controlling and varying the hydraulic fluid pressure supplied to clutch 18 materially affects the operating characteristic of the clutch and in turn the resulting engagement of gears.

With continued reference to FIG. 3, hydraulic fluid supply 12 includes an outlet that supplies hydraulic fluid through line 30 to pilot valve 14, pressure regulating valve 16 and optionally pressure sensor 26. Fluid supply 12 may comprise conventional components known to those of ordinary skill in the art, for example, pumps, pressure regulating devices, valves and the like. Fluid supply 12 provides hydraulic fluid at a nominal feed pressure ($P_F$) in accordance with the design requirements of any particular constructed embodiment.

Pilot valve 14 includes (i) an inlet to receive the supply of hydraulic fluid at the feed pressure, which in the FIG. 3 is designated Pf, via line 30 as well as (ii) an outlet coupled to a line 32. Pilot valve 14 is configured to provide hydraulic fluid at a pilot pressure ($P_P$) that is variable in accordance with a pilot valve drive signal 34. Pilot valve 14 may comprise conventional components known to those of ordinary skill in the art. In one embodiment, pilot valve 14 may comprise a pressure control solenoid (for example a variable bleed solenoid, or variable flow solenoid), a current controlled device that produces an output pressure as a function of an applied current (i.e., pilot valve drive signal 34). In an alternate embodiment, pilot valve 14 may comprise a pulse-width modulated (PWM) actuator that produces an output pressure corresponding to the duty cycle of an input drive signal. It should be understood that the present invention is not limited to these two embodiments, which are merely exemplary and not limiting in nature.

Pressure regulating valve 16 is provided with (i) an inlet for receiving a supply of hydraulic fluid as well as (ii) an output configured for connection to clutch 18 via line 36. Valve 16 is configured to provide fluid on line 36 at an output pressure ($P_C$) to the clutch that is variable in accordance with the pilot pressure ($P_P$). Pressure regulating valve 16 is configured to provide flow at a greater level than available with pilot valve 14, in accordance with the requirements of clutch 18 (e.g., 5-6 liters per minute). Valve 16 may comprise conventional components known in the art, for example, in one embodiment, valve 16 may comprise a pilot operated spool valve.

Pilot pressure sensor 24 is in fluid communication with line 32 and is configured to sense the pilot pressure ($P_P$) and generate a pilot pressure signal 38 indicative of the sensed pilot pressure. Pressure sensor 24 may comprise conventional components known in the art.

Feed pressure sensor 26 may be optionally included in apparatus 10. Sensor 26 (if provided) is in fluid communication with supply line 30 and is configured to sense the feed pressure ($P_F$) and generate a feed pressure signal 40 indicative of the sensed feed pressure. Feed pressure sensor 26 may comprise conventional components known in the art. In an alternate embodiment, pressure sensor 26 is omitted and is substituted with means 26' for generating a feed pressure estimation parameter 40' that is indicative of the feed pressure. In this alternative embodiment, pressure estimation parameter 40' is provided to control arrangement in lieu of pressure signal 40.

An estimated feed pressure (e.g., the pressure estimation parameter 40') may be achieved by a mathematical model describing the relationship of the commanded supply pressure and the output supply pressure. Such model can have various forms, such as mathematical equations, empirical data and a combination of both. The developed model can be executed in control software running inside the transmission control unit (not shown in FIG. 3), and can use various known control methodologies, including Proportional-Integral (P-I) type control, and Proportional-Integral-Differential (P-I-D) type control.

Control arrangement 28 is configured to generate pilot valve drive signal 34 in response to (i) a clutch pressure command signal 42 indicative of a desired output pressure ("clutch pressure") and (ii) pilot pressure signal 38 (as a feedback signal) indicative of the sensed pilot pressure. The principle of the present invention is that there is a relationship between clutch pressure ($P_C$) and pilot pressure ($P_P$) that can be characterized with sufficient definiteness to implement in control arrangement 28. Therefore, "closed loop" clutch pressure control can be achieved, effectively, by way of closed loop pilot pressure control. In one embodiment, the relationship may be characterized in terms of a mathematical model describing the relationship between the clutch pressure and the pilot pressure. The developed model can be executed in control arrangement 28, as described in greater detail below. The present invention provides the benefits of direct clutch pressure measurement as feedback without the complications of trying to overcome the physical limitations involved in mounting a pressure sensor in the clutch chamber.

With continued reference to FIG. 3, in basic operation, in an automotive automatic transmission system, a desired clutch pressure command 42 is generated by a transmission control unit (TCU—not shown) or the like. As understood in the art, the desired clutch pressure may be based on a variety of factors such as engine rpm, vehicle speed and other driving conditions. Control arrangement 28, configured with the intelligence linking the relationship between clutch pressure and pilot pressure, as described above, internally develops what the desired pilot pressure should be in order to achieve the commanded clutch pressure per the overall transmission control strategy. Control arrangement 28 is further configured to compare the internally developed target pilot pressure with the sensed pilot pressure and produce an error signal representing the difference. The control arrangement uses this error signal in a feedback loop to alter the pilot valve drive signal to reduce the error. Through the foregoing, effective "closed loop" control of the clutch pressure through pilot pressure feedback can be achieved.

Figure 4:
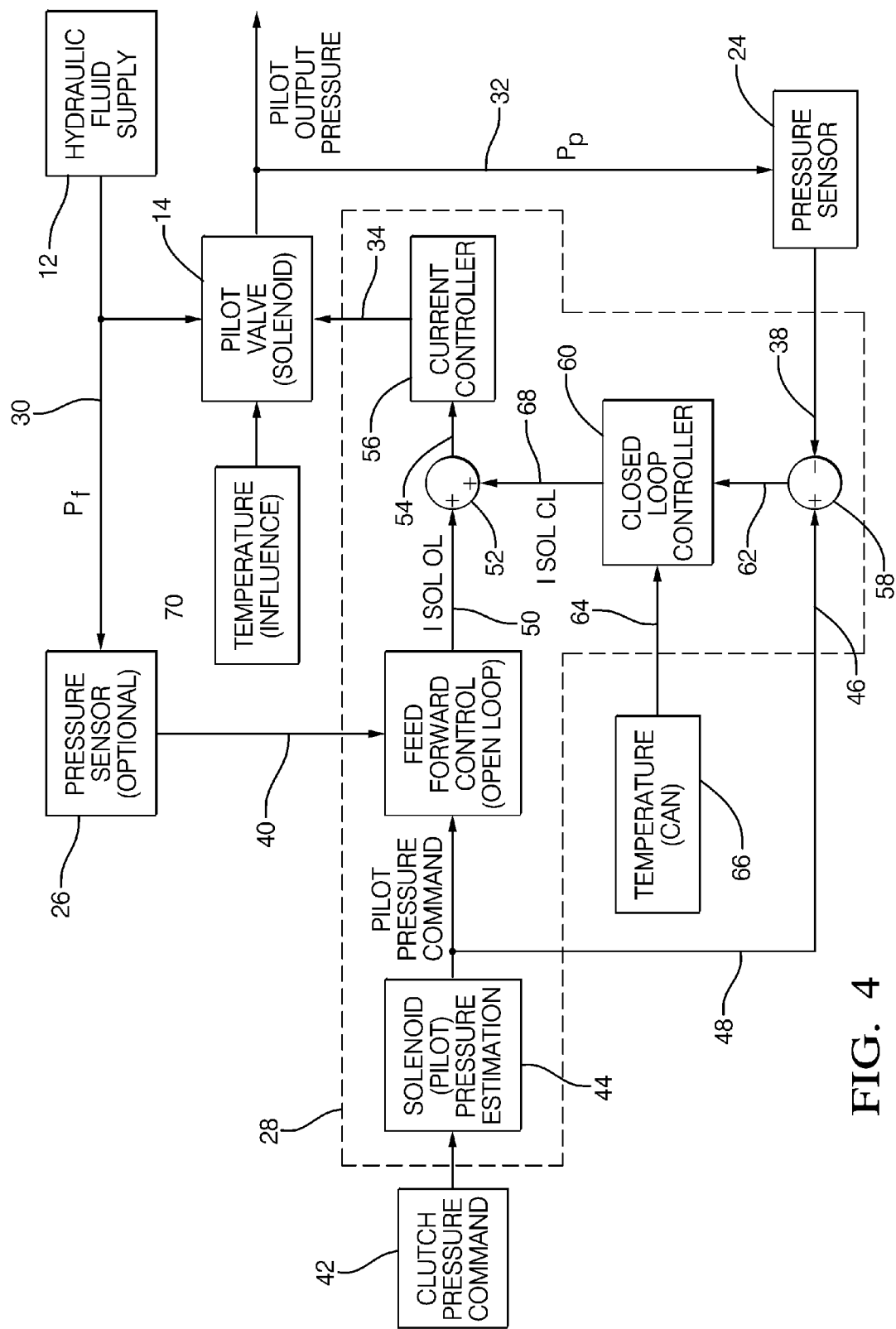
FIG. 4 is a block diagram showing, in greater detail, a control arrangement portion of the components of FIG. 3.

FIG. 4 is a simplified block diagram showing, in greater detail, control arrangement 28 of FIG. 3. Control arrangement 28 includes a pilot pressure estimation block 44. Estimation block 44 is responsive to clutch pressure command signal 42 and is configured to generate a pilot pressure command signal 46 indicative of a desired pilot pressure needed to obtain the commanded (i.e., commanded by clutch pressure command signal 42) clutch pressure ($P_C$). Estimation block 44 is configured to implement the mathematical model describing the relationship between the clutch pressure and the pilot pressure, as described above. In this regard, it should be understood that estimation block 44 may be implemented in hardware, software, firmware, or any combination thereof.

More specifically, the mathematical model describing the relationship between the clutch pressure and the pilot pressure for block 44 can be derived based on the design of the hydraulic circuit using physical laws. Such representation can have various forms, such as force balance equations, Bernoulli and Euler equations, and other physical equations that represent the responses (pressure and time) that the system should see. Because the system is highly complex, models which are based on empirical data, by measuring actual responses of the system in the early development stages, and then modeling the system response via look-up tables and higher order polynomials, is also possible means to model the system. It is also possible to do a combination of the two.

Control arrangement 28 further includes a feed forward control block 48 producing an open loop pilot valve control signal 50, a summer 52 producing an output pilot valve control signal 54, a translation block 56, another summer 58 and a closed loop controller 60.

Feed forward control block 48 is responsive to pilot pressure command signal 46 and feed pressure signal 40 (or estimation parameter 40') for generating control signal 50. In the illustrated embodiment, control signal 50 is shown as i_sol_OL, which is applicable when pilot valve 14 is implemented using a current controlled valve, as described above. It should be understood, however, that block 48 is not so limited, and may be configured to generate control signal 50 applicable for a PWM duty cycle controlled pilot valve, also as described above.

Summer 58 is configured to generate a pilot pressure error signal 62 indicative of a difference between the commanded and sensed pilot pressures. In this regard, summer 58 is responsive to pilot valve command signal 46 and pilot pressure signal 38 (at the inverting input) in generating the error signal 62.

Closed loop controller 60 is responsive to the generated error signal 62 and a temperature signal 64 produced by a temperature sensor 66 or other available source of temperature to generate a closed loop pilot valve control signal 68. Temperature signal 64 via temperature sensor 66 is typically available in automotive applications via a Controller Area Network (CAN), for example.

Summer 52 is configured to sum and generate output pilot valve control signal 54 based on and responsive to (i) open loop pilot valve control signal 50 and (ii) closed loop pilot valve control signal 68. Output control signal 54 is provided to translation block 56.

It should be understood that feed forward block 48, closed loop controller 60 and summers 52, 58 may be configured to interact and cooperate with each other all in accordance with conventional control principles to generate the output control signal 54. For example, the foregoing components may implement proportional integral (PI) control, proportional integral derivative (PID) and any other suitable, conventional control strategy. Other variations are possible in accordance with that known to one of ordinary skill.

Translation block 56 is configured generally to convert or translate output pilot valve control signal 54 to pilot valve drive signal 34. In an embodiment where the pilot valve is a current controlled pilot valve (as described above), the translation block may take the form of a current controller, as shown, which may include pressure-to-current conversion facilities implemented in software, firmware, hardware or a combination thereof In an alternate embodiment where pilot valve 14 comprises a PWM duty cycle controlled valve, the translation block 56 may comprise pressure-to-PWM conversion facilities including a PWM duty cycle controller. One of ordinary skill in the art will recognize that variations are possible, depending on the type of pilot valve used, that remain within the spirit and scope of the invention.

With continued reference to FIG. 4, block 56 outputs pilot valve drive signal 34 (also shown in FIG. 3), which is applied to pilot valve 14 causing it to output hydraulic fluid at the driven pilot pressure. It should be appreciated that temperature can also influence the operation and performance of pilot valve 14—this temperature influence is shown in block form and is designated "70" in FIG. 4. The pilot pressure ($P_P$) is then fed back via pressure sensor 24, all as described above.

In accordance with the invention, a new and improved hydraulic clutch pressure control system is provided which obtains the benefit of direct measure clutch pressure feedback without the difficulties associated with mounting a pressure sensor in a clutch chamber.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An automatic transmission assembly for a vehicle, comprising a transmission assembly housing having therein:
   (a) a torque converter coupling the transmission assembly to an engine drive train;
   (b) a planetary gearset capable of engaging multiple gear configurations for varying driving speeds and conditions;
   (c) a hydraulically-actuated clutch assembly comprising one or more clutch mechanisms for engaging and disengaging components of the planetary gearset in a synchronized fashion to effectuate gear changes;
   (d) a pump coupled to the torque converter for providing pressurized hydraulic fluid;
   (e) a pressure control module comprising a control module housing having therein:
      (1) a plurality of solenoid valves, each of said solenoid valves configured to receive an input of said pressurized hydraulic fluid and to provide a variable output pressure of said pressurized hydraulic fluid in response to an electric control signal;
      (2) means for sensing output pressure from each of the solenoid valves of said plurality of solenoid valves;
      (3) electronic control means configured to generate electric control signals to one or more of the solenoid valves of said plurality of solenoid valves in response to (i) a clutch pressure command signal or a solenoid pressure command signal, and (ii) a solenoid output pressure signal from said means for sensing output pressure; and
   (f) a valvebody comprising a plurality of hydraulic control valves configured to receive hydraulic input signals from the output of said plurality of solenoid valves and to provide hydraulic output signals to hydraulic actuators to actuate said one or more clutch mechanisms in response to said hydraulic input signals.

2. An automatic transmission assembly according to claim 1 wherein said means for sensing output pressure comprises a pressure-sensing element for each of said plurality of solenoid valves, disposed in a manifold.

3. An automatic transmission assembly according to claim 1 wherein said means for sensing output pressure comprises a pressure-sensing element for multiple solenoids, disposed in a manifold.

4. An automatic transmission assembly according to claim 1 wherein said electronic control means comprises:
  (a) a serial data interface for receiving a clutch pressure command signal or a solenoid pressure command signal from a primary transmission controller; and
  (b) a microprocessor in communication with a storage medium including instructions for causing the microprocessor to receive input from said serial data interface and to output a command signal to solenoid driver electronics which comprises an integrated circuit with intelligence or a set of electric components controlled by said microprocessor for generating electrical control signals to said plurality of solenoid valves.

5. An automatic transmission assembly according to claim 4 wherein said storage medium includes instructions for (i) generating a first command signal to the solenoid driver electronics as an open-loop signal in response to said clutch pressure command signal or solenoid pressure command signal, (ii) generating an error signal indicative of a difference between commanded and sensed solenoid output pressure, and (iii) generating a second command signal to the solenoid driver electronics as a closed-loop control signal in response to said first command signal and said error signal.

6. An automatic transmission assembly according to claim 1, further comprising means for sensing or estimating pressure of the input pressure to said plurality of solenoid valves pressurized hydraulic fluid and wherein said electronic control means is further responsive to (iii) solenoid input pressure.

7. An automatic transmission assembly according to claim 1, further comprising means for sensing or estimating pressure of the input pressure to each of said plurality of solenoid valves of pressurized hydraulic fluid and wherein said electronic control means is further responsive to (iii) solenoid input pressure.

8. An automatic transmission assembly according to claim 1 wherein said electronic control means is further responsive to (iii) a temperature signal that indicates the temperature of the pressurized hydraulic fluid.

9. An automatic transmission assembly according to claim 1 wherein said electronic control means is further responsive to (iii) a signal that indicates the voltage available to the electronic control means whereby current of the electric control signal outputted to said one or more of said plurality of solenoid valves is adjusted based on any variations in said voltage.

* * * * *